United States Patent [19]
Kapron et al.

[11] 3,780,295
[45] Dec. 18, 1973

[54] LIGHT SOURCE COUPLER FOR OPTICAL WAVEGUIDE

[75] Inventors: Felix P. Kapron, Elmira; Donald B. Keck, Big Flats, both of N.Y.

[73] Assignee: Corning Glass Works, Corning, N.Y.

[22] Filed: Mar. 30, 1972

[21] Appl. No.: 239,587

[52] U.S. Cl. .......... 250/199, 350/96 B, 350/175 GN
[51] Int. Cl. .............................................. H04b 9/00
[58] Field of Search........... 350/96 R, 96 B, 96 WG, 350/175 G, 175 N, 175 R; 250/199; 333/24, 32

[56] References Cited
UNITED STATES PATENTS
| | | | |
|---|---|---|---|
| 3,297,875 | 1/1967 | Garwin et al. | 250/199 |
| 3,387,909 | 6/1968 | Anderson et al. | 350/96 R |
| 3,579,316 | 5/1971 | Dyott et al. | 350/96 WG |

Primary Examiner—Benedict V. Safourek
Attorney—Clarence R. Patty, Jr. et al.

[57] ABSTRACT

A light coupler for transferring optical wave energy to or from an optical waveguide. This coupler comprises a core of transparent material surrounded by a thin layer of transparent cladding material having a thickness less than a few wavelengths. A conically shaped member which surrounds the transparent layer has its base disposed adjacent to the end of the optical waveguide. The refractive index of the transparent layer is lower than that of the core and the conical member. To couple light to the waveguide, a light beam directed at the tapered surface of the conically shaped member is refracted thereby toward the transparent layer where a portion thereof tunnels into the core and is thereafter coupled into the waveguide. When it is utilized as an output coupler, light radiates from the tapered surface at an angle dependent upon the mode of propagation in the waveguide.

17 Claims, 6 Drawing Figures

PATENTED DEC 18 1973　　　　　　　　　　　　　　　　3,780,295

LIGHT SOURCE COUPLER FOR OPTICAL WAVEGUIDE

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. Higher capacity communication systems operating around $10^{15}$ Hz are needed to accommodate furture increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at frequencies around $10^{15}$ Hz.

The transmitting media required in the transmission of frequencies around $10^{15}$ Hz are hereinafter referred to as "optical waveguides" which normally consist of an optical fiber having a transparent core surrounded by a layer of transparent cladding material having a refractive index lower than that of the core. A very thorough and complete discussion concerning the operational theories of optical waveguides is contained in U.S. Pat. No. 3,157,726 issued to Hicks, et al., and in the publication "Cylindrical Dielectric Waveguide Mode" by E. Snitzer, *Journal of the Optical Society of America*, Vol. 51, No. 5, pages 491–498, May, 1961. Another excellent source of information concerning optical waveguides is *Fiber Optics - Principles and Applications* by N.S. Kapany, Academic Press, 1967.

Explanations of the physics of electrical and magnetic microwave transmission are often based on the concept that such waves are made up of a finite number of modes. Each of these modes has its own propagation and distribution characteristics. The propagation of light waves is governed by laws of physics similar to those that govern microwave propagation and therefore can also be studied in terms of modes. The conditions under which propagation of a particular mode will no longer be localized within and around the core of an optical fiber can be expressed in terms of a cutoff value or parameter $U$. An exceptionally complex equation, and an explanation thereof, from which the value $U$ for a particular mode can be determined may be found on page 55 of the aforementioned book by N.S. Kapany. Kapany also expresses a fiber characteristic term $R$, now commonly referred to as $V$, in terms of the optical fiber variables by the equation $$V = (2\pi a/\lambda) \sqrt{n_1^2 - n_2^2} \quad (1)$$

where $a$ is core radius of the waveguide, $\lambda$ is wavelength of light to be transmitted, $n_1$ is core index of refraction, and $n_2$ is cladding index of refraction, which can be rewritten as $$V = (2\pi a \lambda) \sqrt{(n_1 + n_2)(n_1 - n_2)} \quad (2)$$

Then, as is explained in Kapany, for a particular mode to propagate within an optical fiber having a particular fiber characteristic term $V$, $V$ must be greater than or equal to the cutoff value $U$ for said mode.

For example, the $HE_{11}$ mode is the only mode of light that will propagate along a fiber which has a $V$ value of less than 2.405. Therefore, if V is set equal to 2.405, and equation (2) is evaluated it can be seen that a method of limiting light propagation of a desired wavelength to one mode is to coordinate the waveguide parameters $a$, $n_1$, and $n_2$. That is, if the difference between the two indices of refraction $(n_1 - n_2)$ increases the core radius $a$ must decrease and if $(n_1 - n_2)$ decreases the core radius $a$ must increase. Multimode light waveguide fibers having a $V$ value greater than 2.405 are capable of propagating one or more modes of higher order than the $HE_{11}$ mode, the total number of modes depending upon the $V$ value thereof.

The aforementioned Hicks et al., patent teaches that the optical and physical properties of an optical fiber can be suitably controlled in accordance with the wavelength of the light to be transmitted thereby to cause the fiber to function as a highly efficient optical waveguide and simultaneously transmit one or a number of distinct and separately predetermined modes of energy propagation while rejecting others, with the result that separate modes can be, in effect, utilized as channels for the independent but simultaneous transmission of different information or signals therethrough. It is further stated that in patent that the propagation mode or modes afforded by a very small or ultra small filament depends upon the condition or combination of conditions being used to illuminate the same, and that if all other related factors remain unchanged, different mode propagations through the single fiber may be produced by changing the illumination conditions. Such techniques as changing the frequency or polarization of illumination and directing a cone of light at the end of the waveguide fiber are disclosed.

The propagation of optical wave energy in an optical waveguide fiber has usually been initiated by directing light from a source toward an endface of the fiber. From a geometrical optics viewpoint, the meridional entrance cone in the external medium adjacent to the fiber endface is limited to the half angle $\theta$ measured from the fiber axis, the angle $\theta$ being defined by the equation $$\theta = \sin^{-1} \sqrt{n_1^2 - n_2^2}/n_0 \quad (3)$$

where $n_0$ is the refractive index of the material external to the fiber endface. Since the difference in refractive indices is small in optical waveguides, the half angle $\theta$ is small. Another factor which makes it difficult to couple light into optical waveguides, especially those having cores smaller than about 8 $\mu$m, is the difficulty encountered in focusing a light beam down to the size of the core. Light which is incident upon the entrance endface of the fiber and which impinges upon the cladding has a smaller fraction thereof coupled to a bound mode than light impinging upon the core, and light incident upon the outside circumference is not coupled. If the core radius, $a$ is several wavelengths or less, then from a wave optics viewpoint the entrance cone of a particular mode $(n, m)$ is limited to the angle $\theta_{nm}$ which is given by the following equation $$\theta_{nm} = \sin^{-1} \lambda/2\pi a n_0) V_{nm} \qquad (4)$$

where $V_{nm}$ is the characteristic cutoff parameter for that mode. It is apparent that light impinging upon the fiber endface at a given input solid angle will generally enclose several mode cones. Since the energy distribution is evanescent, some light incident upon the cladding entrance face is likely to be effective in mode launching.

Since very coherent sources of collimated light have yielded the most efficient coupling to optical waveguides, lasers have usually been utilized. Heretofore, light from conventional lasers has been focused onto the core of an optical waveguide in the manner disclosed in U.S. Pat No. 3,395,331 issued to E. Snitzer. Since it is not always possible to focus the entire laser beam onto the fiber core, undesired cladding modes may be excited, resulting in lower coupling efficiencies. For example, when a laser beam was focused down to about a 10 $\mu$m spot encompassing the 2 $\mu$m diameter core of an optical waveguide having a 125 $\mu$m diameter cladding, the $HE_{11}$ mode was excited with an efficiency of only about 50 percent. Moreover, semiconductor laser diodes, which are advantageous in that they are more rugged and compact than conventional lasers, emit light over a relatively large area, the smaller dimension of which is about 8–12 $\mu$. When the light emitting m. of such a diode is disposed immediately adjacent to the end of an optical waveguide, the areal size of the emitted light beam is usually too large to enable efficient coupling thereof into the waveguide.

SUMMARY OF THE INVENTION

The present invention relates to a light coupler which is useful in optical communication systems of the type comprising an optical waveguide having a core of transparent material surrounded by a layer of transparent cladding material. In accordance with the present invention the light coupler is characterized in that it comprises a cylindrical core of transparent material having a thin layer of transparent material disposed upon the surface thereof, the refractive index of the layer being less than that of the cylindrical core. A conically shaped member of transparent material having a refractive index greater than that of the layer is disposed upon the surface of the layer in such a manner that the base of the conical member and an end of the cylindrical core lie in the same plane. Means are provided for supporting an end of the optical waveguide adjacent to the base of the conically shaped member so that the waveguide core is aligned with the cylindrical core.

DESCRIPTION OF THE PREFERRED EMBODIMENTS

Figure 1:
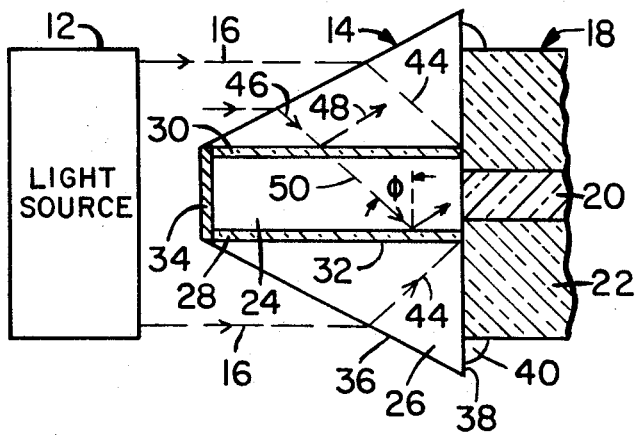
FIG. 1 is a cross-sectional view of a transmitting portion of an optical communication system including a light coupler constructed in accordance with the present invention.

FIG. 1 shows the transmitting portion of an optical communication system including a light source 12 and a light coupler 14 for coupling the light illustrated by broken lines 16 into the input end of an optical waveguide 18 which consists of a core 20 of transparent material surrounded by a layer 22 of transparent cladding material. Any light source may be used in conjunction with coupler 14, but a collimated source such as a laser is preferred since it results in more efficient coupling and coupling of selected modes. The diameter of core 20 may range from about the wavelength of light for a single mode waveguide up to about 1,000 $\mu$m for multimode waveguides, the maximum diameter being limited by the inflexibility of the fiber. Many multimode waveguides of current interest have core diameters less than 25 $\mu$m, since the bandpass of a waveguide decreases as the core size and the number of propagated modes increase. Since multimode waveguides which propagate fewer modes can carry much more information, such guides are preferred over those which propagate many thousands of modes. The light coupler of the present invention is most applicable to those waveguides which have very small diameter cores since the coupling of light into such waveguides by conventional means is relatively inefficient.

Light coupler 14 consists of a core 24 around which is disposed a conically shaped member 26, core 24 and conically shaped member 26 being separated by a thin layer 28. By "conically shaped member" is meant any member having a surface which is at least a portion of a cone. Conically shaped member 26 is a hollow, truncated cone, and other conically shaped members will be described hereinafter. Layer 28 is separated from core 24 by an interface 30 and from member 26 by an interface 32. Core 24, member 26 and layer 28 are all made from transparent material, the refractive index $n_{28}$ of layer 28 being less than the refractive index $n_{24}$ of core 24 and the refractive index $n_{26}$ of member 26. To excite all possible modes in core 24, the refractive index of cone 26 should be greater than that of core 24, but only lower order modes will be excited if the refractive index of core 24 is greater than that of member 26. An opaque layer 34 of light absorbing material such as glass, metal or the like may be disposed on that end of core 24 which is opposite waveguide 18.

Light coupler 14 may be formed in known fashion such as by inserting a polished rod of core glass into a thin walled polished tube of glass suitable for use as layer 28 and inserting the resultant combination into a polished tube of glass suitable for use as member 26. The assembly so formed may be heated and drawn down to a fiber of desired size in a manner well known in the fiber optic fabrication art. After a fiber of the desired cross-sectional dimensions is formed, a section of desired length may be cut and both ends may be polished. The outer glass layer may then be ground and polished to form tapered surface 36 of member 26. Surface 36 could also be formed before severing the cone base 38 from the initially drawn fiber. An alternative method of forming coupler 14 involves a technique utilized in copending application "Method of Producing Optical Waveguide Fibers" by Donald B. Keck and Peter C. Schultz, Ser. No. 36,267 filed on May 11, 1970. In accordance with this alternative method, a film of glass suitable for use as layer 28 is formed on the inside wall of a tube of material suitable for use as member 26 by sintering a film of soot deposited by a flame hydrolysis process. The thickness of the soot layer may be controlled by flow rates, distance between the glass tube and the flame, and the time allowed for deposition. The tube and soot are then heated until the soot sinters. Thereafter, a layer of material suitable for use as core 24 may be deposited on the previously sintered layer by a similar soot depositing and sintering process. Then, in accordance with the teachings of said patent application, the composite structure may be heated and drawn until the inner layer of glass collapses to form a solid core. After having formed the double clad fiber, coupler 14 may be completed as described above. Opaque layer 34 may be deposited before or after surface 36 is formed.

After coupler 14 is fabricated, base 38 is butted against fiber 18 in such a manner that cores 20 and 24 are substantially aligned. This alignment can be accomplished by observing the relative positions of the cores under a microscope and correcting for nonalignment by adjusting micromanipulators connected to coupler 14 and waveguide 18 or by observing maximum transmission through the combination. This type of alignment is possible since cores 28 and 24 can be seen through their respective transparent claddings. A bead 40 of glue, sealing glass or other bonding material may be applied to the junction to maintain proper alignment.

In the embodiment of FIG. 1 the axis of the laser light beam bounded by broken lines 16 is coextensive with the axis of core 24. The laser light is therefore refracted at surface 36 toward interface 32. Each component of refracted light, the extreme rays of which are illustrated by broken lines 44, impinges upon interface 32 at a predetermined angle which is determined by the direction of laser beam 16, the taper angle of member 26 and the refractive indices of member 26 and the surrounding medium. In accordance with a well known principle of optics the refracted light beam passing through member 26 having a refractive index $n_{26}$ can be allowed to reflect from interface 32 by the principle of total internal reflection if the refractive index $n_{28}$ of layer 28 is lower than $n_{26}$ and if the angle of incidence exceeds the critical angle $\phi_c$ given by $$\phi_c = \sin^{-1}(n_{28}/n_{26}) \quad (5)$$

where the angles are measured with respect to a local normal at the interface. However, if the thickness of layer 28 is less than a few wavelengths, the reflection becomes partial and the remaining light tunnels through layer 28 to reappear as a traveling wave in core 24, a process known as frustrated total internal reflection. For such coupling to occur, the thickness $t$ of layer 28 should be less than a few wavelengths and is determined as follows $$t < \lambda/(4\pi \sqrt{n_{24}^2 \sin^2\phi - n_{28}^2}) \quad (6)$$

where $\phi$ is the angle between ray 50 and the normal to interface 30. Cone 26 should be large enough to accept the whole ray bundle from the source. The length of interface 32 should be great enough to receive all of the refracted light. Any refracted light which passes through base 38 obviously cannot be coupled to the core by the process of frustrated total internal reflection. Moreover, if interface 32 is too long, i.e., if it extends beyond the point where the extreme refracted rays 44 impinge, coupling efficiency will decrease since some of the light which had previously been coupled into core 14 will couple back into member 26. Coupling efficiency is also dependent upon the thickness of layer 28.

Figure 2:
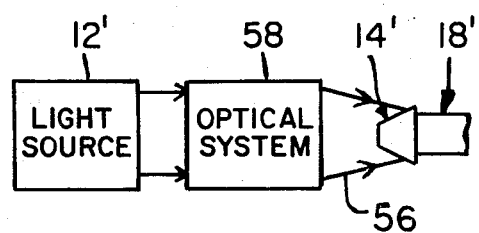
FIG. 2 shows an optical system which may be used to direct a beam of light toward the light coupler of FIG. 1.

Consider, for example, a typical refracted ray 46 which partially reflects from interface 32 to form ray 48 and partially tunnels through layer 28 to form ray 50. As a result of ray 50 entering core 24, all modes will be excited therein for which the angle $\phi$ is greater than the critical angle $$\phi_{nm}{}^c = \cos^{-1}(/2\pi a n_{24}) V_{nm} \quad (7)$$

for that mode, although all modes will not be excited with the same excitation efficiency. The angle $\phi$ can be varied by changing the angle or refractive index of the cone or by converging or diverging the input light beam. FIG. 2 is broadly illustrative of a system for providing a converging or diverging beam, a converging beam 56 being depicted radiating from optical system 58. Other elements in FIG. 2, which correspond to elements in FIG. 1 are indicated by primed reference numerals.

Opaque layer 34 or some similar means for preventing laser light from impinging upon the end of core 24 is utilized when it is desired to excite waveguide modes in core 24 solely by the process of frustrated total internal reflection. Layer 34 may be omitted to excite modes by frustrated total internal reflection and by the impinging of laser light directly upon the end of core 24.

Although the drawing indicates that core 24 is slightly larger in diameter than core 20 of optical waveguide 18, the diameter of core 24 could be equal to or less than that of core 20. The diameter of core 24 and the relative refractive indices of core 24, layer 28 and member 26 are preferably chosen so that the energy distribution of the guided wave proceeding down core 24 toward waveguide 18 approximates the energy distribution of the mode or modes of light propagation in waveguide 18. The coupling efficiency between core 24 and optical waveguide 18 decreases when such parameters as diameter of core 24 and the refractive indices of each of the elements of coupler 14 depart from optimum values. In order to provide efficient transfer of light from coupler 14 to waveguide 18, the refractive indices of cores 24 and 20 should be substantially equal, and these cores are preferably made of the same material.

Figure 3:
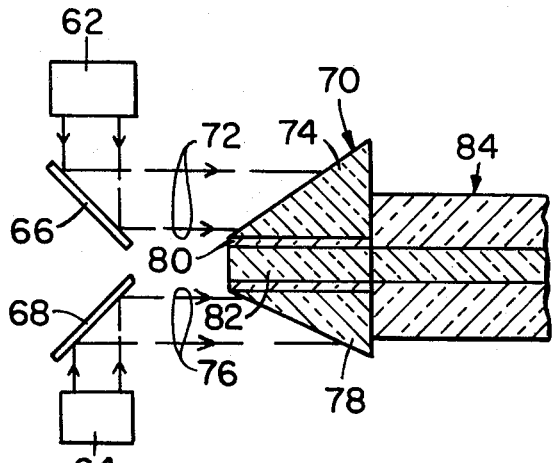
FIG. 3 is a cross-sectional view of an alternative embodiment for coupling a plurality of light beams to a single waveguide.
Figure 4:
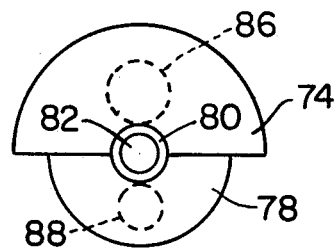
FIG. 4 is an end view of the coupler of FIG. 3.

Two or more separate information carrying light beams can be coupled into a single optical waveguide and propagated therein as separate modes by a method similar to that described in connection with FIG. 1. In FIG. 3 independently modulated light beams from sources 62 and 64 reflect from mirrors 66 and 68 and impinge upon different portions of coupler 70. Light beam 72, which originates at source 62 impinges upon conical segment 74, and light beam 76, which originates at source 64, impinges upon conical segment 78. Conical segments 74 and 78 are disposed upon the surface of a thin transparent layer 80 which is disposed upon the surface of transparent core 82. Depending upon the refractive index of segment 74 and the angle of taper thereof, light beam 72 will be refracted toward layer 80, and some of that refracted light will tunnel into core 82 and initiate therein a few modes of light wave propagation, one mode usually being excited with greater efficiency than the others. Similarly, light beam 76 is refracted toward core 82 at some different angle which depends upon the refractive index and taper angle of segment 78. Since this latter described beam of refracted light enters core 82 at an angle different from that of the refracted light resulting from beam 72, it will initiate in core 82 one or more modes of light wave propagation which are different from those initiated by light beam 72. The two different modes or different groups of modes initiated in core 82 are coupled into the adjacent waveguide 84. Although FIG. 4 illustrates segments 74 and 78 as each consisting of one half of a cone intersecting abruptly, it is noted that only those portions of segments 74 and 78 within dashed lines 86 and 88 must be ground and polished to provide the proper entrance base for light beams 72 and 76. Since light does not enter the segments in any other area except those bounded by the dashed lines, the curvature of the remaining portions of the surfaces of segments 74 and 78 is not critical. Three or more segments can be utilized to couple additional light beams to the optical waveguide.

Figure 5:
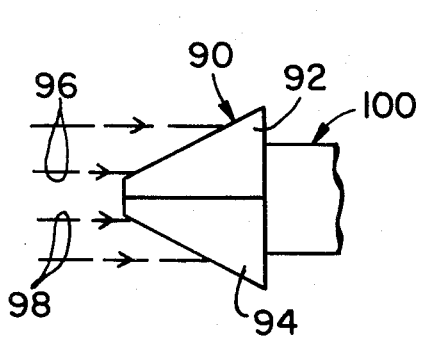
FIG. 5 shows another embodiment for coupling plurality of light beams to a single optical waveguide.

Since the angle at which light refracts into a conical segment depends upon both the taper angle and refractive index thereof, the taper angles of two or more segments may be identical if the refractive index of the segments differ. In the embodiment illustrated in FIG. 5 light coupler 90 consists of two conical segments 92 and 94 which have identical taper angles, but they have different refractive indices. Therefore, light beams 96 and 98, the directions of which are parallel to the longitudinal axis of coupler 90 will be refracted toward the coupler core at different angles and will therefore initiate in the core the propagation of different modes which are coupled into waveguide 100.

Figure 6:
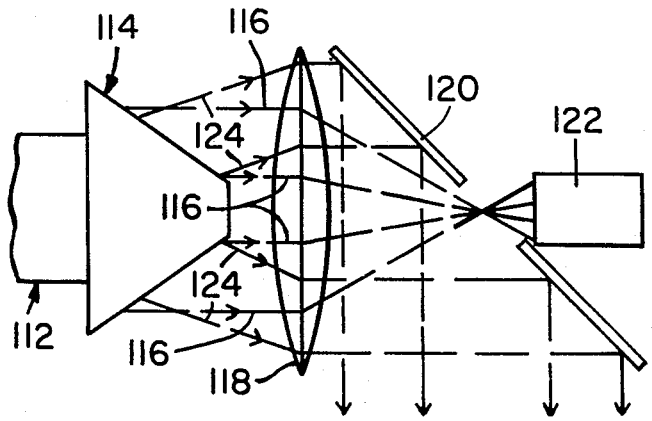
FIG. 6 shows a receiving portion of an optical communication system which utilizes the light coupler of the present invention.

FIG. 6 shows the receiver portion of an optical communication system including an optical waveguide 112 and a light coupler 114, the internal construction of which is similar to that of coupler 14 of FIG. 1. Two sets of light rays are illustrated as radiating from coupler 114 at different angles with respect to the longitudinal axis thereof, each set of light rays resulting from a given mode or closely related group of modes. A first set of light rays illustrated by dashed lines 116 radiates from the coupler and is focused by an optical system represented by lens 118, through an aperture in mirror 120 to a light detector 122. The second set of rays represented by dashed lines 124 is focused by lens 118 and reflected by mirror 120 toward another utilization device (not shown).

We claim:

1. In an optical communication system of the type wherein optical wave energy is propagated in a cylindrical, dielectric optical waveguide having a core of material that is transparent to light of at least a given wavelength and a layer of cladding material disposed upon the surface of said core, said cladding material being transparent to light of said given wavelength, a light coupler comprising
   a cylindrical core of material that is transparent to light of said given wavelength,
   a thin layer of material that is transparent to light of said given wavelength, said layer being disposed upon the surface of said cylindrical core, the refractive index of said layer being less that that of said cylindrical core,
   a conically shaped member of material that is transparent to light of said given wavelength, said member being disposed upon the surface of said layer in such a manner that the base of said conically shaped member and an end of said cylindrical core lie in the same plane, the refractive index of said layer being less than that of said member, and
   means for supporting an end of said optical waveguide adjacent to the base of said conically shaped member so that said waveguide core is aligned with said cylindrical core and the base of said conically shaped member is disposed adjacent to said waveguide cladding layer.

2. An optical communication system in accordance with claim 1 further comprising light absorbing means disposed on the end of said cylindrical core which is opposite said optical waveguide.

3. An optical communication system in accordance with claim 1 wherein said system further comprises light source means for directing light onto the tapered surface of said conically shaped member.

4. An optical communication system in accordance with claim 3 wherein said light source means provides a converging beam of light.

5. An optical communication system in accordance with claim 3 wherein said light source means provides a diverging beam of light.

6. An optical communication system in accordance with claim 3 wherein said conically shaped member comprises a plurality of segments which refract light from said source toward said layer at different angles.

7. An optical communication system in accordance with claim 6 wherein each of said conical segments has a different taper angle.

8. An optical communication system in accordance with claim 6 wherein each of said conical segments has a different refractive index.

9. An optical communication system in accordance with claim 6 wherein said light source means provides a plurality of beams of light, each of which is separately modulated and each of which propagates towards said coupler in a direction parallel to the longitudinal axis of said core.

10. An optical communication system in accordance with claim 1 wherein the radius of said optical waveguide core is susbstantially equal to the radius of said cylindrical core.

11. An optical communication system in accordance with claim 1 wherein the refractive index of said waveguide core is substantially equal to that of said cylindrical core.

12. An optical communication system in accordance with claim 1 wherein said coupler is disposed at the output end of said waveguide, said system further comprising means for detecting light emanating from said coupler.

13. An optical communication system in accordance with claim 12 wherein said coupler provides a plurality of light beams which radiate therefrom at different solid angles, and means for directing one of said plurality of beams toward said light detecting means.

14. An optical communication system in accordance with claim 1 wherein said cylindrical core, said thin layer and said conically shaped member are formed of glass.

15. An optical communication system of the type comprising a cylindrical, dielectric optical waveguide having a core of material that is transparent to light of at least a given wavelength, said waveguide core being surrounded by a layer of cladding material that is disposed upon the surface of said core, said cladding material being transparent to light of said given wavelength, a source of optical wave energy, and a light coupler for receiving light from said source and initiating in said waveguide the propagation of light waves therein, said light coupler being characterized in that it comprises a cyindrical core of glass that is transparent to light of said given wavelength, a thin layer disposed upon the surface of said cylindrical core, said layer consisting of a glass that is transparent to light of said given wavelength, the refractive index of said layer being less than that of said cylindrical core, the thickness of said layer being small enough to permit the tunneling of light therethrough by the principle of frustrated total internal reflection, means for refracting light from said source toward said layer, and means for supporting an end of said optical waveguide adjacent to that end of said cylindrical core from which light emanates, said cylindrical coupler core being substantially aligned with the core of said optical waveguide.

16. An optical communication system in accordance with claim 15 further comprising means disposed in the path of said optical wave energy for preventing said energy from reaching the end of said cylindrical core.

17. An optical communication system in accordance with claim 14 wherein said means for refracting comprises a conically shaped member of glass that is transparent to light of said given wavelength, said member being disposed upon the surface of said layer in such a manner that at least a portion of the base of said conically shaped member is disposed adjacent to said end of said optical waveguide.

* * * * *